(12) United States Patent
Niimi (10) Patent No.: US 7,904,230 B2
(45) Date of Patent: Mar. 8, 2011

(54) CONTROL APPARATUS AND CONTROL METHOD FOR VEHICLE

(75) Inventor: Kuniaki Niimi, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 201 days.

(21) Appl. No.: 12/408,871

(22) Filed: Mar. 23, 2009

(65) Prior Publication Data

US 2009/0265075 A1 Oct. 22, 2009

(30) Foreign Application Priority Data

Apr. 17, 2008 (JP) .................................. 2008-108147

(51) Int. Cl.
*B60W 10/06* (2006.01)
*F02D 45/00* (2006.01)

(52) U.S. Cl. ...................................................... 701/102

(58) Field of Classification Search .................. 701/102, 701/101, 110, 115, 51, 54; 477/115, 121, 477/123, 156
See application file for complete search history.

(56) References Cited

U.S. PATENT DOCUMENTS

| 4,599,918 | A | * | 7/1986 | Stelter et al. | ..................... 477/80 |
| 4,663,713 | A | * | 5/1987 | Cornell et al. | ................... 701/52 |
| 5,540,632 | A | * | 7/1996 | Lardy et al. | ..................... 477/43 |
| 6,616,575 | B1 | * | 9/2003 | Lorentz | ......................... 477/115 |

FOREIGN PATENT DOCUMENTS

| JP | 2005-127185 | 5/2005 |
| JP | 2006-2740 | 1/2006 |
| JP | 2007-22296 | 2/2007 |
| JP | 2007-131102 | 5/2007 |

OTHER PUBLICATIONS

Office Action issued Jan. 21, 2010, in Japanese Patent Application No. 2008-108147 (with English Partial Translation of Notification of Reasons for Refusal).

* cited by examiner

*Primary Examiner* — Hieu T Vo
(74) *Attorney, Agent, or Firm* — Oblon, Spivak, McClelland, Maier & Neustadt, L.L.P.

(57) ABSTRACT

A control apparatus for a vehicle is equipped with a detection portion that detects a required output of an internal combustion engine, an acquisition portion that acquires an ignition timing of the internal combustion engine, a setting portion that sets an operation curve of the internal combustion engine such that the operation curve approaches an optimal fuel consumption operation curve as the acquired ignition timing is retarded with respect to a set ignition timing, a decision portion that decides a target power of the internal combustion engine on the basis of the detected required output and the set operation curve, and a control portion for controlling the internal combustion engine on the basis of the decided target power.

14 Claims, 8 Drawing Sheets

| | | DECREASES IN OUTPUT ← | | | INCREASES IN OUTPUT → |
|---|---|---|---|---|---|
| RETARDATION AMOUNT | REQUIRED OUTPUT | A | B | ... | G |
| a | NE | e(0) | e(1) | | e(6) |
| a | TE | f(0) | f(1) | | f(6) |
| b | NE | g(0) | g(1) | | g(6) |
| b | TE | h(0) | h(1) | | h(6) |
| c | NE | i(0) | i(1) | | i(6) |
| c | TE | j(0) | j(1) | | j(6) |
| d | NE | l(0) | l(1) | | l(6) |
| d | TE | m(0) | m(1) | | m(6) |

ADVANCEMENT SIDE ↑ ↓ RETARDATION SIDE

CONTROL APPARATUS AND CONTROL METHOD FOR VEHICLE

INCORPORATION BY REFERENCE

The disclosure of Japanese Patent Application No. 2008-108147 filed on Apr. 17, 2008 including the specification, drawings and abstract is incorporated herein by reference in its entirety.

BACKGROUND OF THE INVENTION

1. Field of the Invention

The invention relates to the control of a vehicle mounted with a transmission that continuously changes the transmission speed of a motive power of an internal combustion engine and transmits the motive power to driving wheels, and more particularly, to an art of making an improvement in fuel consumption while suppressing the generation of vibrations and noise in an internal combustion engine.

2. Description of the Related Art

As a vehicle mounted with a transmission that continuously changes the transmission speed of a motive power of an internal combustion engine and transmits the motive power to driving wheels, there is known, for example, a hybrid vehicle or a vehicle mounted with a continuously variable transmission. In a vehicle mounted with such a transmission, a target power of an internal combustion engine is decided from an accelerator opening degree and a speed of the vehicle, and the internal combustion engine and the transmission are controlled such that the target power emerges on an optimal fuel consumption operation curve.

As a vehicle mounted with such a transmission, for example, Japanese Patent Application Publication No. 2007-22296 (JP-A-2007-22296) discloses a hybrid vehicle that does not give a driver a sense of incongruity resulting from an abnormal noise such as a muffled sound of an internal combustion engine or the like while making a further improvement in energy efficiency. This hybrid vehicle is equipped with the internal combustion engine, electric power/motive power input/output means connected to an output shaft of the internal combustion engine and an axle side to make it possible to output at least part of a motive power from the internal combustion engine to the axle side while having an electric power and the motive power input thereto and output therefrom, an electric motor that outputs a motive power for running, storage means capable of exchanging an electric power with the electric power/motive power input/output means and the electric motor, required driving force setting means for setting a required driving force required for running, noise level detection means for detecting a level of noise based on running, operational restriction setting means for setting an operational restriction imposed on the operation of the internal combustion engine on the basis of the detected level of noise, and control means for controlling the internal combustion engine, the electric power/motive power input/output means, and the electric motor such that the internal combustion engine is operated on the basis of the set operational restriction and that the hybrid vehicle runs by a driving force based on the set required driving force.

According to the hybrid vehicle disclosed in the aforementioned publication, the driver can be restrained from feeling a sense of incongruity due to an abnormal noise such as a muffled sound or the like. As described above, the operational restriction is set in accordance with the level of noise. Therefore, the degree of freedom of the operational restriction set in accordance with the level of noise can be increased. Accordingly, the operational restriction can also be set such that the efficiency of the internal combustion engine for an output is enhanced without giving the driver a sense of incongruity resulting from an abnormal noise such as a muffled sound or the like.

However, in the hybrid vehicle disclosed in the aforementioned publication, an operation point set for an output corresponds to a rotational speed and a torque that increase and decrease respectively as the speed range of the vehicle shifts to a low vehicle speed range. Therefore, the internal combustion engine operates outside a low fuel consumption range, and there is hence a deterioration in fuel consumption. The deterioration in fuel consumption results from a deterioration in the thermal efficiency of the engine, and moreover, the temperature of exhaust gas rises. As a result, the temperature in an engine room may rise to cause a deterioration in overheat tolerance.

Further, in the case where the engine is operated in a low vehicle speed range with good fuel consumption, vibrations with a high frequency and a large amplitude may occur, or the frequency of the occurrence of knock increases in a high load range. The levels of noise and vibrations generated in the internal combustion engine may thereby increase to make the driver feel uncomfortable.

SUMMARY OF THE INVENTION

The invention provides a control apparatus and a control method for a vehicle that make an improvement in fuel consumption while suppressing increases in the levels of noise and vibrations generated in an engine.

A control apparatus for a vehicle according to a first aspect of the invention is a control apparatus for a vehicle mounted with an internal combustion engine and a transmission that continuously changes a transmission speed of a motive power of the internal combustion engine and transmits the motive power to driving wheels. The internal combustion engine is operationally controlled along an operation curve set on a basis of a state of the internal combustion engine on a coordinate plane corresponding to torque and rotational speed. The coordinate plane has set thereon in advance an optimal fuel consumption operation curve corresponding to the internal combustion engine. The control apparatus for the vehicle according to the foregoing first aspect of the invention includes a required output detection portion that detects a required output of the internal combustion engine, an ignition timing acquisition portion that acquires an ignition timing of the internal combustion engine, an operation curve setting portion that sets an operation curve of the internal combustion engine such that the operation curve approaches the optimal fuel consumption operation curve as the acquired ignition timing is retarded with respect to a set ignition timing, a target power decision portion that decides a target power of the internal combustion engine on a basis of the detected required output and the set operation curve, and a control portion that controls the internal combustion engine on a basis of the decided target power. Further, a control method for a vehicle according to a second aspect of the invention has a configuration similar to that of the control apparatus for the vehicle according to the foregoing first aspect of the invention.

According to the control apparatus for the vehicle according to the foregoing first aspect of the invention, the operation curve of the internal combustion engine is so set as to approach the optimal fuel consumption operation curve corresponding to the internal combustion engine as the acquired ignition timing is retarded. Therefore, an improvement in fuel consumption can be made. The improvement in fuel consumption results from an increase in thermal efficiency, and the temperature of exhaust gas can thereby be restrained from rising. Therefore, a deterioration in overheat tolerance can be suppressed. Further, in the case where the ignition timing is controlled to a retardation side with a view to, for example, avoiding the occurrence of knock, the level of engine noise decreases as the ignition timing is retarded with respect to the set ignition timing. Therefore, increases in the levels of noise and vibrations resulting from the approach of the operation curve to the optimal fuel consumption operation curve can be absorbed. As a result, a driver can be restrained from feeling uncomfortable due to engine noise. Accordingly, it is possible to provide a control apparatus and a control method for a vehicle that make an improvement in fuel consumption while suppressing increases in the levels of noise and vibrations generated in an engine.

BRIEF DESCRIPTION OF THE DRAWINGS

The foregoing and/or further objects, features and advantages of the invention will become more apparent from the following description of preferred embodiments with reference to the accompanying drawings, in which like numerals are used to represent like elements and wherein.

DETAILED DESCRIPTION OF EMBODIMENTS

The embodiments of the invention will be described hereinafter with reference to the drawings. In the following description, like components are denoted by like reference symbols. The components denoted by the same reference symbols are identical to one another in name and function as well. Accordingly, detailed description of those components will not be repeated.

A control block diagram of a hybrid vehicle to which a control apparatus according to the first embodiment of the invention is applied will be described with reference to FIG. 1.

The hybrid vehicle includes an internal combustion engine (hereinafter referred to simply as the engine) 120 as a drive source, for example, a gasoline engine or the like, and motor generators (MG) 140 as rotating electrical machines. In FIG. 1, there are two motor generators MG1 and MG2 as the motor generators 140. The respective motor generators 140 function as either generators or motors in accordance with a running state of the hybrid vehicle.

An intake passage 122 of an engine 120 is provided with an air cleaner 122A for capturing dust in intake air, an air flow meter 122B for detecting an amount of air sucked into the engine 120 through the air cleaner 122A, and an electronic throttle valve 122C as a valve for adjusting an amount of air sucked into the engine 120. The electronic throttle valve 122C is provided with a throttle position sensor 122D. An intake air amount detected by the air flow meter 122B, an opening degree of the electronic throttle valve 122C detected by the throttle position sensor 122D, and the like are input to an engine electronic control unit (ECU) 280.

Further, an exhaust passage 124 of the engine 120 is provided with a three-way catalytic converter 124B, an air-fuel ratio sensor 124A for detecting an air-fuel ratio (A/F) of exhaust gas introduced into the three-way catalytic converter 124B, a catalyst temperature sensor 124C for detecting a temperature of the three-way catalytic converter 124B, and a muffler 124D. An air-fuel ratio of exhaust gas introduced into the three-way catalytic converter 124B, which is detected by the air-fuel ratio sensor 124A, a temperature of the three-way catalytic converter 124B detected by the catalyst temperature sensor 124C, and the like are input to the engine ECU 280.

The air-fuel ratio sensor 124A is an all-range air-fuel ratio sensor (linear air-fuel ratio sensor) that generates an output voltage proportional to an air-fuel ratio of a mixture burned in the engine 120. An O2 sensor for detecting in an on-off manner whether the air-fuel ratio of the mixture burned in the engine 120 is rich or lean with respect to a stoichiometric air-fuel ratio may be used as the air-fuel ratio sensor 124A.

A knock sensor 360 detects vibrations of a cylinder block of the engine 120. The knock sensor 360 sends a signal indicating detected vibrations of the engine 120.

An output shaft of the engine 120 is provided with a crank position sensor 380. The crank position sensor 380 detects a rotational speed of the output shaft (crankshaft) of the engine 120. The crank position sensor 380 sends a signal indicating the detected rotational speed of the output shaft to the engine ECU 280.

In addition, the engine 120 is provided with an ignition device 400 that performs an ignition processing using ignition plugs provided in respective cylinders in accordance with a control signal of the engine ECU 280. The ignition device 400 performs the ignition processing by means of the ignition plugs at ignition timings set for the cylinders respectively, on the basis of a control signal received from the engine ECU 280.

The hybrid vehicle further includes a reducer 180, a motive power splitting mechanism (e.g., a planetary gear mechanism) 200, a running battery 220, an inverter 240, a battery control unit (hereinafter referred to as the battery ECU) 260, the engine ECU 280, an MG_ECU 300, and an HV_ECU 320. It should be noted herein that the reducer 180 transmits motive powers generated by the engine 120 and the motor generators 140 to driving wheels 160 and transmits the driving of the driving wheels 160 to the engine 120 and the motor generators 140. The motive power splitting mechanism 200 distributes a motive power generated by the engine 120 to two routes, namely, the driving wheels 160 and the motor generator MG1. The running battery 220 is charged with an electric power for driving the motor generators 140. The inverter 240 performs current control while converting a direct current of the running battery 220 and alternating currents of the motor generators MG1 and MG2. The battery ECU 260 supervises and controls a charge/discharge state of the running battery

220. The engine ECU 280 controls an operation state of the engine 120. The MG_ECU 300 controls the motor generators 140, the battery ECU 260, the inverter 240, and the like in accordance with a state of the hybrid vehicle. The HV_ECU 320 mutually supervises and controls the battery ECU 260, the engine ECU 280, the MG_ECU 300, and the like to control an entire hybrid system such that the hybrid vehicle can run most efficiently. The running battery may be replaced with a storage mechanism such as a capacitor or the like.

In this embodiment of the invention, a converter 242 is provided between the running battery 220 and the inverter 240. The rated voltage of the running battery 220 is lower than the rated voltages of the motor generators MG1 and MG2. Therefore, when an electric power is supplied from the running battery 220 to the motor generators MG1 and MG2, the converter 242 is used to raise the voltage of the electric power. This converter 242 has a smoothing capacitor built in. When the converter 242 performs a voltage raising operation, electric charges are accumulated in this smoothing capacitor.

Figure 1:
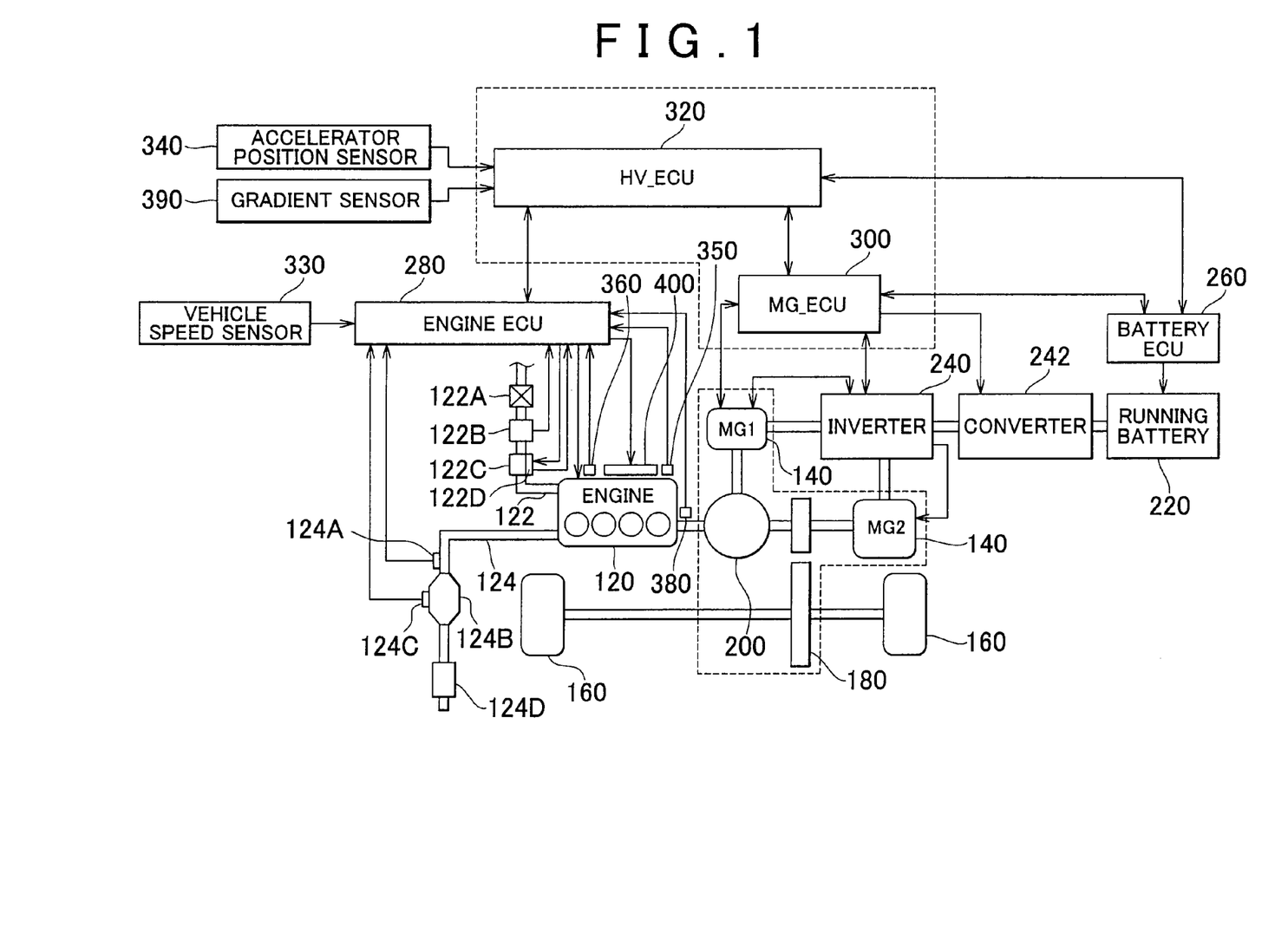
FIG. 1 is a control block diagram of a hybrid vehicle according to the first embodiment of the invention.

Although the respective ECU's are separately configured in FIG. 1, two or more of the ECU's may be configured as an integrated ECU (e.g., as indicated by dotted lines in FIG. 1, the MG_ECU 300 and the HV_ECU 320 may be configured as an integrated ECU).

A driver's seat (not shown) is provided with an accelerator pedal, and an accelerator position sensor 340 detects a depression amount of the accelerator pedal. The accelerator position sensor 340 outputs a signal indicating the depression amount of the accelerator pedal to the HV_ECU 320. The HV_ECU 320 controls an output of the engine 120 or an electric power generation amount via the motor generators MG1 and MG2 and the engine ECU 280 in accordance with a required driving force corresponding to the depression amount. The engine ECU 280 receives a signal indicating the depression amount of the accelerator pedal via the HV_ECU 320.

Furthermore, a vehicle speed sensor 330 is a sensor for detecting a physical quantity associated with a speed of the vehicle. "The physical quantity associated with the speed of the vehicle" may be, for example, a rotational speed of an axle or a rotational speed of an output shaft of the transmission. The vehicle speed sensor 330 sends the detected physical quantity to the engine ECU 280. In this embodiment of the invention, the vehicle speed sensor 330 is described as being connected to the engine ECU 280, but may be configured to be connected to any of the other ECU's. The engine ECU 280 may receive a signal indicating a speed of the vehicle via any of the other ECU's.

A coolant temperature sensor 350 detects a temperature of coolant of the engine 120. The coolant temperature sensor 350 sends a signal indicating the detected temperature of coolant of the engine 120 to the engine ECU 280.

A gradient sensor 390 detects a gradient of a road surface. The gradient sensor 390 sends a signal indicating the detected gradient of the road surface to the HV_ECU 320. The engine ECU 280 receives the signal indicating the gradient of the road surface via the HV_ECU 320. For example, a G sensor or the like may be used as the gradient sensor 390.

A planetary gear mechanism is used as the motive power splitting mechanism 200 to distribute a motive power of the engine 120 to both the driving wheels 160 and the motor generator MG1. By controlling the rotational speed of the motor generator MG1, the motive power splitting mechanism 200 functions as a continuously variable transmission as well.

In the hybrid vehicle mounted with the hybrid system as shown in FIG. 1, when the engine 120 operates with low efficiency, for example, in starting off or while running at low speeds, the hybrid vehicle runs by only one of the motor generators 140, namely, the motor generator MG2. While running normally, the motive power of the engine 120 is distributed to two routes by, for example, the motive power splitting mechanism 200, and while the driving wheels 160 are directly driven, the motor generator MG1 is driven to generate an electric power. At this moment, the generated electric power is used to drive the motor generator MG2, thereby providing assistance in driving the driving wheels 160. Further, while running at high speeds, an electric power from the running battery 220 is additionally supplied to the motor generator MG2 to increase the output thereof, thereby adding a driving force to the driving wheels 160.

On the other hand, while decelerating, the motor generator MG2, which is driven by the driving wheels 160, functions as a generator to perform regenerative electric power generation, and accumulates a regenerated electric power into the running battery 220. In the case where the charge amount of the running battery 220 has decreased to such an extent that the running battery 220 needs to be charged in particular, the output of the engine 120 is increased to increase the amount of the electric power generated by the motor generator MG1 and hence increase the charge amount of the running battery 220. As a matter of course, the control of increasing the driving force of the engine 120 may be performed if necessary, even while running at low speeds. This control is performed in the case where, for example, the running battery 220 needs to be charged as described above, an auxiliary such as an air-conditioner or the like is driven, or the temperature of coolant of the engine 120 is raised to a predetermined temperature.

Furthermore, in the hybrid vehicle mounted with the hybrid system as shown in FIG. 1, the engine 120 is stopped to make an improvement in fuel consumption when the vehicle is in a certain operating state or the running battery 220 is in a certain state. Then, after that as well, the operating state of the vehicle and the state of the running battery 220 are detected, and the engine 120 is restarted. As described above, the hybrid vehicle shown in FIG. 1 is different from a vehicle mounted only with an engine in that the engine 120 is intermittently operated. In the vehicle mounted only with the engine, when an ignition switch is turned to a START position to start the engine, the engine is not stopped until the ignition switch is turned from an ON position to an ACC position or an OFF position.

Furthermore, in the hybrid vehicle as shown in FIG. 1, the engine ECU 280 controls the operation of the engine 120 along an operation curve that is set on the basis of a state of the engine 120 on a coordinate plane corresponding to torque and rotational speed.

Figure 2:
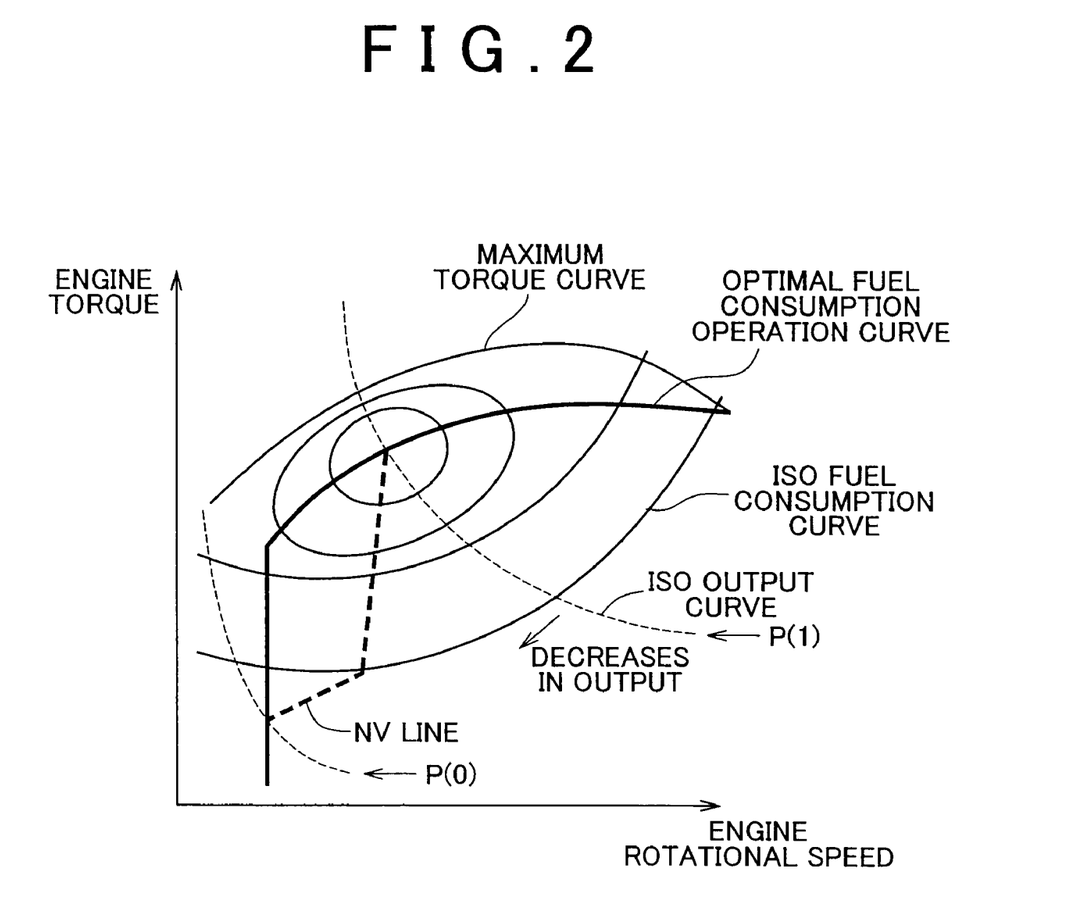
FIG. 2 is a diagram (no. 1) showing an operation curve of an engine.

As shown in FIG. 2, an axis of ordinate represents a torque of the engine 120, and an axis of abscissa represents a rotational speed of the engine 120. On this coordinate plane, an optimal fuel consumption operation curve (a thick line of FIG. 2) corresponding to the engine 120 is set in advance. The optimal fuel consumption operation curve is set in advance through experimental adaptation or the like, as an operation curve with a good fuel consumption characteristic during operation of the engine 120, on the basis of an iso fuel consumption curve on the coordinate plane.

Further, when the output of the engine 120 is equal to or larger than a predetermined output P(0) and equal to or smaller than a predetermined output P(1) larger than the output P(0) on the optimal fuel consumption curve, the engine ECU 280 operates the engine 120 along a predetermined operation curve (thick broken lines of FIG. 2) on which an increase in torque for an increase in rotational speed is gentler than on the optimal fuel consumption curve. This operation curve will be described hereinafter as an NV line. The NV line is adapted through an experiment or the like as an operation curve for suppressing the generation of noise and vibrations, in a range where the output of the engine 120 is equal to or larger than the predetermined output P(0) and equal to or smaller than the predetermined output P(1). The NV line is an operation curve set in the case where the ignition timing of the engine 120 is a predetermined ignition timing or an ignition timing advanced with respect to the predetermined ignition timing.

Therefore, the levels of vibrations and noise generated in a low rotation/high load range of the engine 120 can be made low by operating the engine 120 along the NV line. Thus, a driver of the vehicle can be restrained from feeling uncomfortable as a result of the transmission of vibrations and noise generated in the engine 120 into a vehicle interior.

Further, the engine ECU 280 detects a vibration intensity in a range (hereinafter referred to as a gate) advanced from a top dead center in each of the cylinders by a predetermined crank angle, by means of a knock sensor 360. The engine ECU 280 extracts a peak value of the detected vibration intensity in the gate. When the extracted peak value is larger than a knock criterial value, the engine ECU 280 determines that knock has occurred. When it is determined that knock has occurred, the engine ECU 280 changes an ignition timing in that one of the cylinders in which knock has occurred, to a retardation side by a predetermined value. On the other hand, when it is not determined that knock has occurred before the lapse of a predetermined time, the engine ECU 280 changes an ignition timing in each of the cylinders to an advancement side by a predetermined value.

The engine ECU 280 uses a learning value of the changed ignition timing for subsequent ignition control. That is, during subsequent ignition control, the engine ECU 280 controls the ignition device 400 such that the ignition timing corresponds to the learning value.

In the engine 120 having the configuration as described above, the ignition timing corresponding to the occurrence of knock is retarded as the load increases. Especially in a high load range, knock may occur before the ignition timing reaches a minimum advance for best torque (MBT) corresponding to the generation of a maximum torque. Therefore, the ignition timing controlled by the engine ECU 280 is set to an ignition timing that shifts to the retardation side as the load increases.

As described above, when the NV line is set as the operation curve in the low rotation/high load range of the engine 120, the engine 120 is operated outside a low fuel consumption range, and hence a deterioration in fuel consumption may be caused. Further, the ignition timing is set as a value that shifts to the retardation side as the load increases, with a view to avoiding the occurrence of knock. Therefore, a further deterioration in fuel consumption may be caused. Such a deterioration in fuel consumption may result in a deterioration in thermal efficiency, and cause a rise in the temperature of exhaust gas and a rise in the temperature in an engine room.

Further, in the case where the optimal fuel consumption operation curve is set as the operation curve in the low rotation/high load range, the driver may feel uncomfortable due to the generation of noise and vibrations with low frequencies and large amplitudes.

Thus, the invention is characterized in that the engine ECU 280 sets the operation curve of the engine 120 such that the operation curve approaches an optimal fuel consumption operation curve as the ignition timing is retarded with respect to a set ignition timing.

The engine ECU 280 sets an operation curve of the engine 120 corresponding to the acquired ignition timing when the required output of the engine 120 is equal to or larger than the predetermined output (1) and equal to or smaller than a predetermined output (2) smaller than the predetermined output (1). The operation curve that is set when the ignition timing is retarded with respect to a predetermined ignition timing at which the NV line is set is an operation curve having a lower rotational speed and a larger torque for an output than an operation curve corresponding to the predetermined ignition timing.

Figure 3:
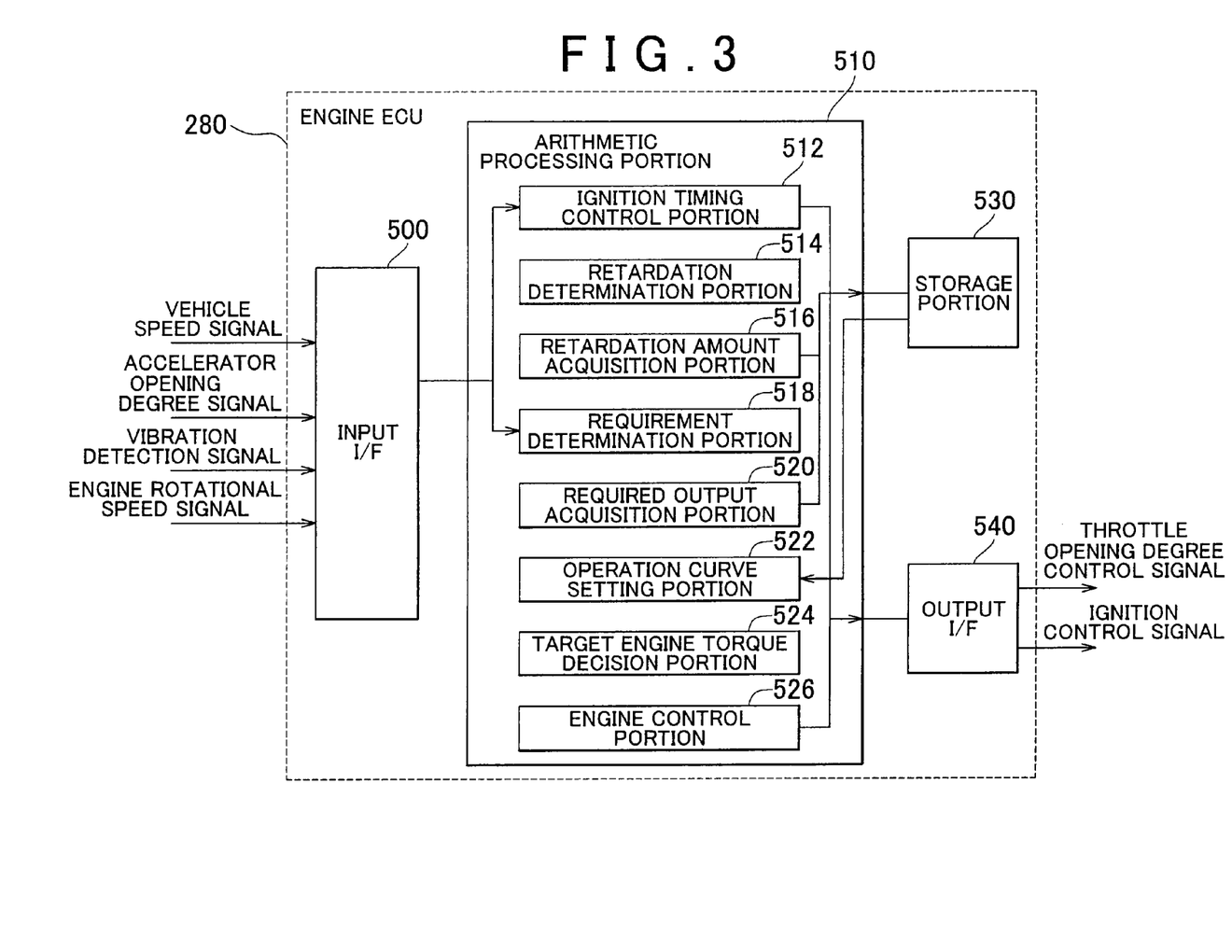
FIG. 3 is a functional block diagram of an engine ECU as a control apparatus for the vehicle according to the first embodiment of the invention.

FIG. 3 shows a functional block diagram of the engine ECU 280 as the control apparatus for the vehicle according to this embodiment of the invention.

The engine ECU 280 includes an input interface (hereinafter referred to as the input I/F) 500, an arithmetic processing portion 510, a storage portion 530, and an output interface (hereinafter referred to as the output I/F) 540.

The input I/F 500 receives a vehicle speed signal from the vehicle speed sensor 330, an accelerator opening degree signal from the accelerator position sensor 340, a vibration detection signal from the knock sensor 360, and an engine rotational speed signal of the crank position sensor 380, and sends these signals to the arithmetic processing portion 510.

The arithmetic processing portion 510 includes an ignition timing control portion 512, a retardation determination portion 514, a retardation amount acquisition portion 516, a requirement determination portion 518, a required output acquisition portion 520, an operation curve setting portion 522, a target torque decision portion 524, and an engine control portion 526.

The ignition timing control portion 512 determines, on the basis of a knock criterial value and a peak value of a vibration intensity in a gate of each of the cylinders, whether or not knock has occurred. When it is determined that knock has occurred, the ignition timing control portion 512 changes an ignition timing for that one of the cylinders in which knock has occurred to a retardation side by a predetermined value. When it is not determined that knock has occurred until a predetermined time elapses, the ignition timing control portion 512 changes an ignition timing for each of the cylinders to an advancement side by a predetermined value.

The ignition timing control portion 512 uses the changed ignition timing as a learning value of the ignition timing for subsequent ignition control. That is, during subsequent ignition control, the ignition timing control portion 512 generates an ignition control signal such that the ignition timing corresponds to the learning value, and sends the ignition control signal to the ignition device 400 via the output I/F 540.

The retardation determination portion 514 determines whether or not the ignition timing of the engine 120 is being retarded. More specifically, when the ignition timing corresponding to the aforementioned learning value of the ignition timing is retarded with respect to the predetermined ignition timing, the retardation determination portion 514 determines that the ignition timing of the engine 120 is being retarded.

The predetermined ignition timing makes it possible to absorb noise that is generated in the engine 120 when, for example, the operation curve is made to approach the optimal fuel consumption operation curve, through noise reduction resulting from the changing of the ignition timing to the retardation side. This predetermined ignition timing is adapted through an experiment or the like. The retardation determination portion 514 may turn a retardation determination flag on when, for example, it is determined that the ignition timing of the engine 120 is being retarded.

When it is determined that the ignition timing of the engine 120 is being retarded, the retardation amount acquisition portion 516 acquires a retardation amount, and stores the retardation amount into the storage portion 530. The retardation amount acquisition portion 516 acquires, for example, a retardation amount from a reference value (e.g., zero) of the ignition timing to the ignition timing corresponding to the learning value, and stores the retardation amount into the storage portion 530.

The requirement determination portion 518 determines whether or not an iso output curve of a required output based on a required driving force passes the NV line. That is, the requirement determination portion 518 calculates a driving force required of the vehicle on the basis of an accelerator opening degree. The requirement determination portion 518 calculates an output required of the engine 120 on the basis of the calculated required driving force and a speed of the vehicle. The requirement determination portion 518 determines whether or not the iso output curve of the calculated required output passes the NV line (whether or not the iso output curve and the NV line intersect with each other). When the calculated required output is equal to or larger than the predetermined output (1) and equal to or smaller than the predetermined output (2), the requirement determination portion 518 determines that the iso output curve of the required output based on the required driving force passes the NV line. It is also appropriate to set in advance a plurality of iso output curves on a coordinate plane of torque and rotational speed, and cause the requirement determination portion 518 to specify that one of the iso output curves which corresponds to the required output through, for example, linear interpolation of the plurality of the set iso output curves.

The requirement determination portion 518 may determine that the iso output curve of the required output based on the required driving force passes the NV line when, for example, the rotational speed of the engine 120 is equal to or lower than a predetermined rotational speed and the required output of the engine 120 is equal to or larger than the predetermined output (1).

Further, the requirement determination portion 518 may determine whether or not the iso output curve of the required output of the engine 120 passes the NV line when, for example, the retardation determination flag is on, and may turn a requirement determination flag on when it is determined that the iso output curve passes the NV line.

When it is determined that the iso output curve of the required output based on the required driving force passes the NV line, the required output acquisition portion 520 acquires a required output, and stores the required output into the storage portion 530.

The operation curve setting portion 522 sets an operation curve on the basis of the retardation amount stored in the storage portion 530. For example, the operation curve setting portion 522 sets that one of a plurality of operation curves which corresponds to the retardation amount on the basis of the retardation amount stored in the storage portion 530, according to a predetermined table shown in FIG. 4.

Figure 4:
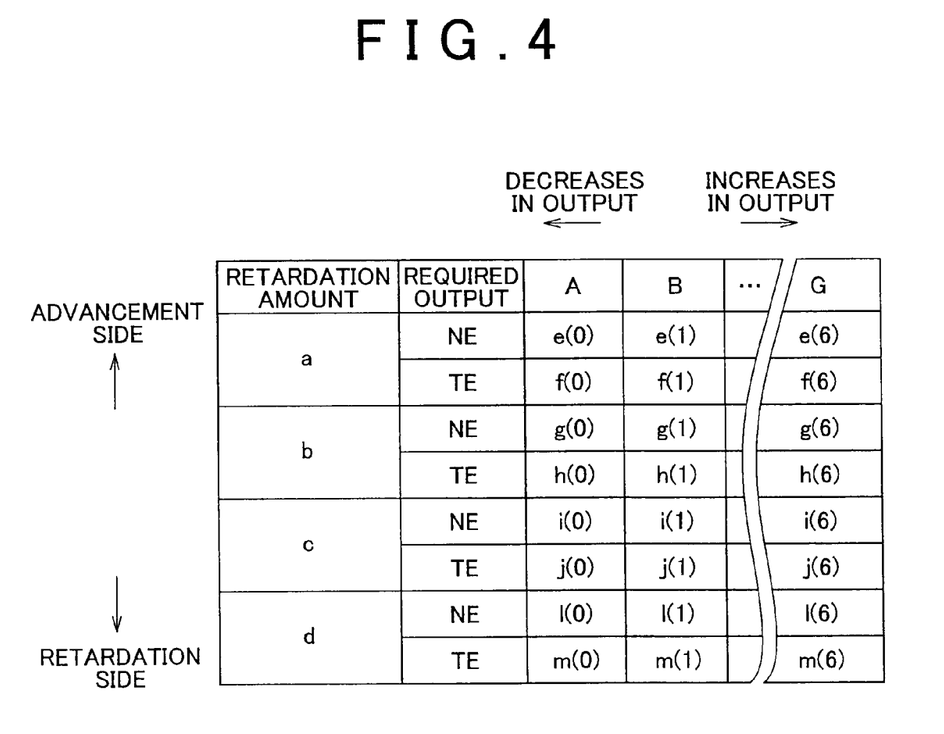
FIG. 4 is a table showing operation curves of the engine corresponding to retardation amounts according to the first embodiment of the invention.

The table shown in FIG. 4 is adapted through an experiment or the like, and is stored in advance into the storage portion 530. In the table of FIG. 4, retardation amounts a to d are assigned to respective lines in the longitudinal direction of the sheet, and required outputs A to G are assigned to respective columns in the lateral direction of the sheet. In changing from the retardation amount a to the retardation amount d, the retardation amount shifts from the advancement side to the retardation side. In changing from the required output A to the required output G, the required output increases.

In the table shown in FIG. 4, operation curves corresponding to the retardation amounts a to d respectively are set. The operation curves are set by rotational speeds NE and torques TE that correspond to the required outputs A to G respectively. For example, in the case of the retardation amount a, rotational speeds e(0) to e(6) and torques f(0) to f(6) are assigned to the required outputs A to G respectively. By the same token, in the case of the retardation amount b, rotational speeds g(0) to g(6) and torques h(0) to h(6) are assigned to the required outputs A to G respectively. Further, in the case of the retardation amount c, rotational speeds i(0) to i(6) and torques j(0) to j(6) are assigned to the required outputs A to G respectively. Furthermore, in the case of the retardation amount d, rotational speeds l(0) to l(6) and torques m(0) to m(6) are assigned to the required outputs A to G respectively.

The rotational speed of the engine 120 corresponding to an output is so set as to decrease as the retardation amount increases from the retardation amount a to the retardation amount d. The torque of the engine 120 corresponding to an output is so set as to increase as the retardation amount increases from the retardation amount a to the retardation amount d. In addition, the operation curves corresponding to the retardation amounts a to d respectively are set such that at least the torque rises as the required output increases.

Accordingly, the operation curve setting portion 522 sets operation curves specified by the rotational speeds e(0) to e(6) and the torques f(0) to f(6), which correspond to the required outputs A to G respectively, when, for example, the retardation amount stored in the storage portion 530 is a. A retardation amount or a required output that is not shown in the table of FIG. 4 may be calculated through linear interpolation or the like, using the values shown in the table of FIG. 4. Further, in this embodiment of the invention, the table of FIG. 4 is shown as an example. However, the invention is not particularly limited to a configuration in which operation curves are given by a table. For example, the operation curves may be given by a mathematical expression or a map.

The target torque decision portion 524 decides a target torque of the engine 120 on the basis of a required output and a set operation curve. For example, when the retardation amount is a and the required output is A, the target torque decision portion 524 decides f(0) as a target torque.

The engine control portion 526 generates a throttle opening degree control signal such that a throttle opening degree corresponding to the decided target torque is obtained, and sends the throttle opening degree control signal to the electronic throttle valve 122C via the output I/F 540.

Further, in this embodiment of the invention, the ignition timing control portion 512, the retardation determination portion 514, the retardation amount acquisition portion 516, the requirement determination portion 518, the required output acquisition portion 520, the operation curve setting portion 522, the target torque decision portion 524, and the engine control portion 526 may all function as a piece of software that is realized through the execution of a program stored in the storage portion 530 by a central processing unit (CPU), or may all be realized by a piece of hardware, and should not be limited in particular. This program is recorded on a storage medium, and this storage medium is mounted on the vehicle.

A control structure of the program executed by the engine ECU 280 as the control apparatus for the vehicle according to this embodiment of the invention will be described hereinafter with reference to FIG. 5.

In step (which will be described hereinafter as S) 100, the engine ECU 280 determines whether or not the ignition timing of the engine 120 is being retarded. When the ignition timing of the engine 120 is being retarded (YES in S100), the processing procedure is shifted to S102. If not (NO in S100), the processing procedure is returned to S100.

In S102, the engine ECU 280 acquires a retardation amount. The engine ECU 280 then determines in S104 whether or not the iso output curve of the required output passes the NV line. When the iso output curve of the required output passes the NV line (YES in S104), the processing procedure is shifted to S106. If not (NO in S104), the processing procedure is returned to S100.

In S106, the engine ECU 280 acquires a required output. In S108, the engine ECU 280 sets an operation curve on the basis of the acquired retardation amount. In S110, the engine ECU 280 decides a target torque on the basis of the set operation curve and the required output. In S112, the engine ECU 280 controls the engine 120 such that the decided target torque is obtained.

Figure 6:
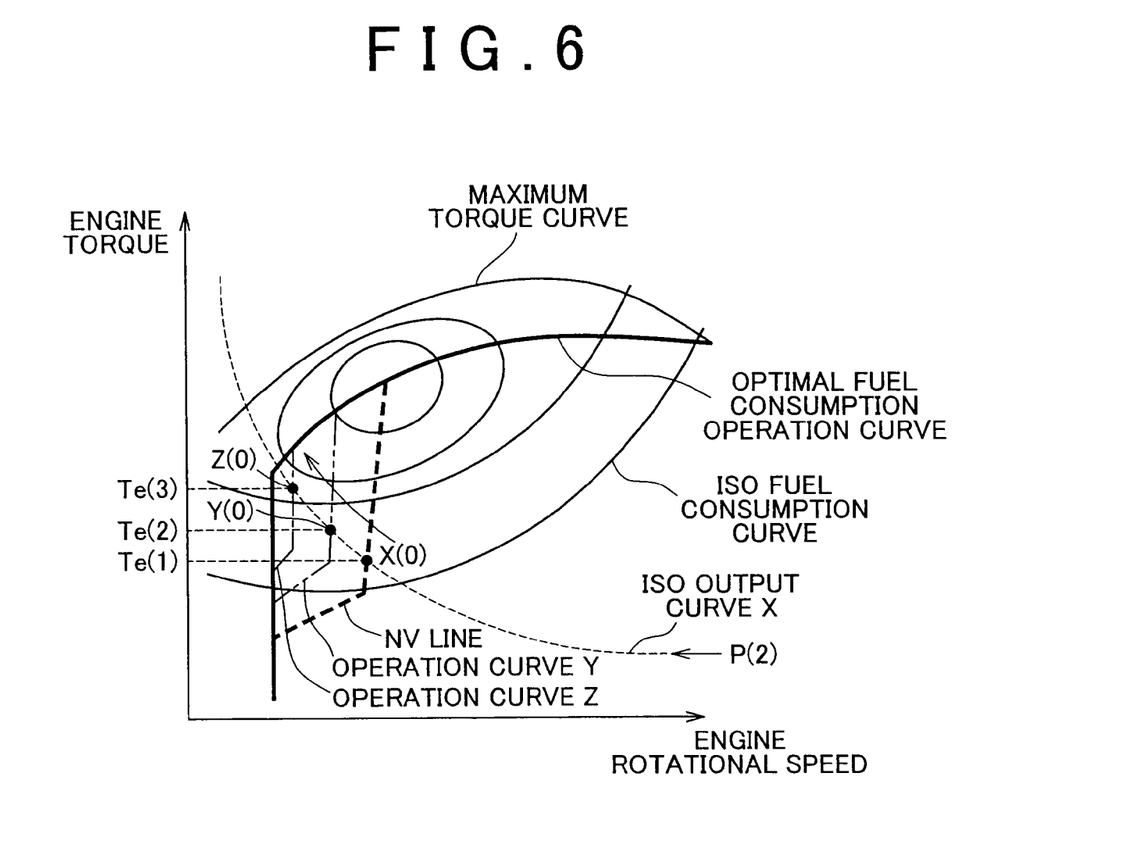
FIG. 6 is a diagram (no. 2) showing operation curves of the engine.

The operation of the engine ECU 280 as the control apparatus for the vehicle according to this embodiment of the invention, which is based on the aforementioned structure and the aforementioned flowchart, will be described using FIG. 6.

For example, a required driving force is calculated on the basis of an opening degree of the accelerator pedal based on the operation of the driver. A required output P(2) is calculated on the basis of the calculated required driving force and a speed of the vehicle. An iso output curve X of FIG. 6 is specified on the basis of the calculated required output P(2). When the ignition timing of the engine 120 is not being retarded (NO in S100), the NV line shown as thick broken lines in FIG. 6 is set as the operation curve of the engine 120. Therefore, a torque Te(1) corresponding to an intersection point X(0) of the NV line and the iso output curve X is decided as a target torque. The engine 120 is controlled on the basis of the decided target torque. The engine 120 operates along the NV line unless the retardation amount increases.

On the other hand, when the ignition timing of the engine 120 is being retarded due to a decrease in the speed of the vehicle and a rise in load or the like (YES in S100), the retardation amount a is acquired (S102). When it is determined that the iso output curve X of the required output based on the required driving force passes the NV line (YES in S104) and the required output P(2) of the engine 120 is acquired (S106), an operation curve Y (alternate long and two short dashes lines of FIG. 6) is set on the basis of the acquired retardation amount a (S108). A torque Te(2) corresponding to an intersection point Y(0) of the acquired required output P(2) and the set operation curve Y is then decided as a target torque (S110). The engine 120 is controlled on the basis of the decided target torque (S112). The engine 120 operates along the operation curve Y unless the retardation amount further increases.

It should be noted herein that since the operation curve Y has a sharper increase in torque for an increase in engine rotational speed and is closer to the optimal fuel consumption operation curve than the NV line, an improvement in fuel consumption is made in comparison with a case where the engine 120 is operated along the NV line.

Further, since the engine 120 is operated along the operation curve Y, which is closer to the optimal fuel consumption operation curve than the NV line, the level of engine noise increases as a result of the approach of the operation curve to the optimal fuel consumption operation curve. However, the ignition timing is set on the retardation side to reduce engine noise, and an increase in the level of noise is thereby absorbed.

When the ignition timing of the engine 120 is retarded with respect to a predetermined retardation amount due to a further decrease in the speed of the vehicle and a further rise in load or the like (YES in S100), the retardation amount b is acquired (S102). When it is determined that the iso output curve X of the required output based on the required driving force passes the NV line (YES in S104), the required output P(2) of the engine 120 is acquired (S106). An operation curve Z (alternate long and short dash lines of FIG. 7) is set on the basis of the acquired retardation amount b (S108), and a torque Te(3) corresponding to an intersection point Z(0) of the acquired required output P(2) and the set operation curve Z is decided as a target torque (S110). The engine 120 is controlled on the basis of the decided target torque (S112). The engine 120 operates along the operation curve Z unless the retardation amount further increases.

Figure 7:
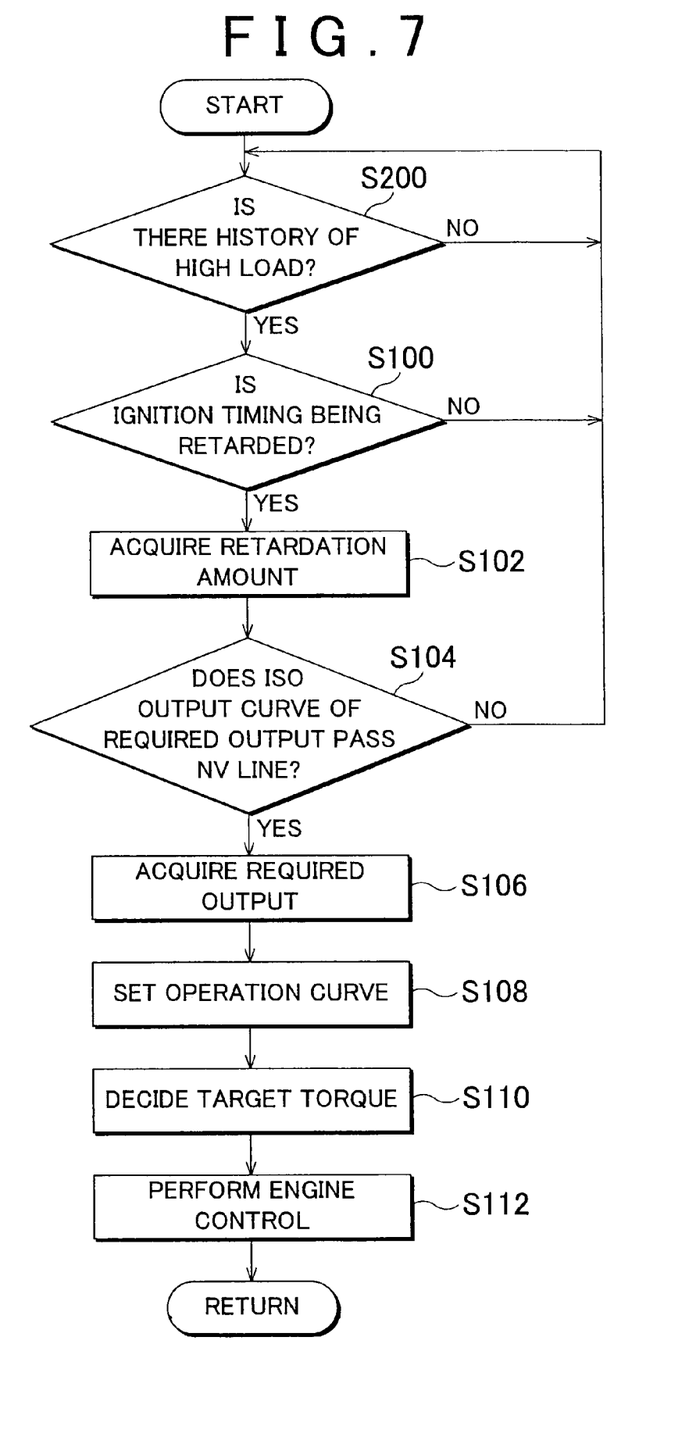
FIG. 7 is a chart showing a control structure of a program executed by an engine ECU as a control apparatus for a vehicle according to the second embodiment of the invention.

It should be noted herein that since the operation curve Z has a sharper increase in torque for an increase in engine rotational speed and is still closer to the optimal fuel consumption operation curve than the NV line and the operation curve Y, an improvement in fuel consumption is made in comparison with a case where the engine 120 is operated along the NV line or the operation curve Y.

Further, the level of engine noise further increases as a result of the closer approach of the operation curve to the optimal fuel consumption operation curve with a view to operating the engine 120 at a point still closer to the optimal fuel consumption operation curve. However, the ignition timing is set on the retardation side with respect to the retardation amount a to reduce engine noise, and an increase in the level of noise is thereby absorbed.

As described above, according to the control apparatus for the vehicle according to this embodiment of the invention, the operation curve of the engine is so set as to approach the optimal fuel consumption curve as the acquired ignition timing is retarded. Therefore, an improvement in fuel consumption can be made. The improvement in fuel consumption leads to the enhancement of thermal efficiency and makes it possible to restrain the temperature of exhaust gas from rising. Therefore, a deterioration in overheat tolerance can be suppressed. Further, the level of engine noise decreases as the acquired ignition timing is retarded. Therefore, increases in the levels of noise and vibrations resulting from the approach of the operation curve to the optimal fuel consumption operation curve can be absorbed. As a result, the driver can be restrained from feeling uncomfortable due to engine noise. Accordingly, it is possible to provide a control apparatus and a control method for a vehicle that make an improvement in fuel consumption while suppressing increases in the levels of noise and vibrations generated in an engine.

By setting the operation curve such that the operation curve approaches the optimal fuel consumption operation curve as the ignition timing of the engine is retarded in a specific range where the output of the engine is equal to or larger than the predetermined output P(0) and equal to or smaller than the predetermined output P(1) on the optimal fuel consumption operation curve, an improvement in fuel consumption can be made while suppressing deteriorations in vibrations and noise. Further, for example, in a specific range where the rotational speed of the engine is low and the load of the engine is high, the levels of vibrations and noise generated in the engine are high. Therefore, by setting the operation curve in accordance with the ignition timing in such a range, an improvement in fuel consumption can be made while suppressing vibrations and noise generated in the engine.

Further, when the ignition timing is retarded with respect to a predetermined ignition timing, an operation curve having a lower rotational speed and a larger torque for an output than an operation curve corresponding to the predetermined ignition timing is set. Therefore, vibrations and noise can be suppressed when the ignition timing is the predetermined ignition timing, and a deterioration in fuel consumption can be suppressed while suppressing vibrations and noise when the ignition timing is retarded with respect to the predetermined ignition timing.

When the ignition timing is advanced with respect to the predetermined ignition timing, the driver can be restrained from feeling uncomfortable due to vibrations and noise, by setting a predetermined operation curve having a gentler increase in torque for an increase in rotational speed of the engine than the operation curve that is set when the ignition timing is retarded with respect to the predetermined ignition timing.

Although the example in which the invention is applied to the hybrid vehicle has been described, the invention is applicable to a vehicle mounted with a transmission that continuously changes the transmission speed of a motive power of an engine and transmits the motive power to driving wheels. The transmission that continuously changes the transmission speed of the motive power of the engine and transmits the motive power to the driving wheels should not be limited in particular to the aforementioned motive power splitting mechanism of the hybrid vehicle, and may be, for example, a continuously variable transmission.

Even when the invention is applied to a continuously variable transmission, an improvement in fuel consumption can be made while suppressing noise and vibrations generated in the engine.

Further, according to the description of this embodiment of the invention, that one of the plurality of the preset operation curves which corresponds to an ignition timing is selected, and the engine is controlled. However, in the case where an operation curve is learned in accordance with an operating state of the engine, it is appropriate to select that one of a plurality of learned operation curves which corresponds to an ignition timing.

A control apparatus for a vehicle according to the second embodiment of the invention will be described hereinafter. The control apparatus for the vehicle according to this embodiment of the invention is different in the control structure of a program executed by the engine ECU 280 from the control apparatus for the vehicle according to the foregoing first embodiment of the invention. The other components of the control apparatus for the vehicle according to the second embodiment of the invention are identical to those of the control apparatus for the vehicle according to the foregoing first embodiment of the invention. Those components are denoted by the same reference symbols and function in the same manner as well. Accordingly, detailed description of those components will not be described herein.

This embodiment of the invention is characterized in that the engine ECU 280 sets the operation curve in accordance with the ignition timing of the engine 120 when the load history of the engine 120 is a history of intermittently or continuously remaining in a high load state.

A load history of the engine 120 may be detected from a history of the temperature of coolant detected by the coolant temperature sensor 350, a running history stored in a navigation system (not shown), or a history of the gradient of a road surface detected by the gradient sensor 390.

For example, when the temperature of coolant continues to be equal to or higher than a predetermined temperature for a predetermined time, the engine ECU 280 may determine that the load history of the engine 120 is a history of intermittently or continuously remaining in a high load state. When a running history corresponding to map information or running information stored in the navigation system is a history of running uphill for a predetermined period or a predetermined distance or running at full throttle, the engine ECU 280 may determine that the load history of the engine 120 is a history of intermittently or continuously remaining in a high load state. When a running history of continuing to run uphill for a predetermined period or a predetermined distance is detected on the basis of a gradient of a road surface detected by the gradient sensor 390, the engine ECU 280 may determine that the load history of the engine 120 is a history of intermittently or continuously remaining in a high load state.

A control structure of a program executed by the engine ECU 280 as the control apparatus for the vehicle according to this embodiment of the invention will be described with reference to FIG. 7.

Figure 5:
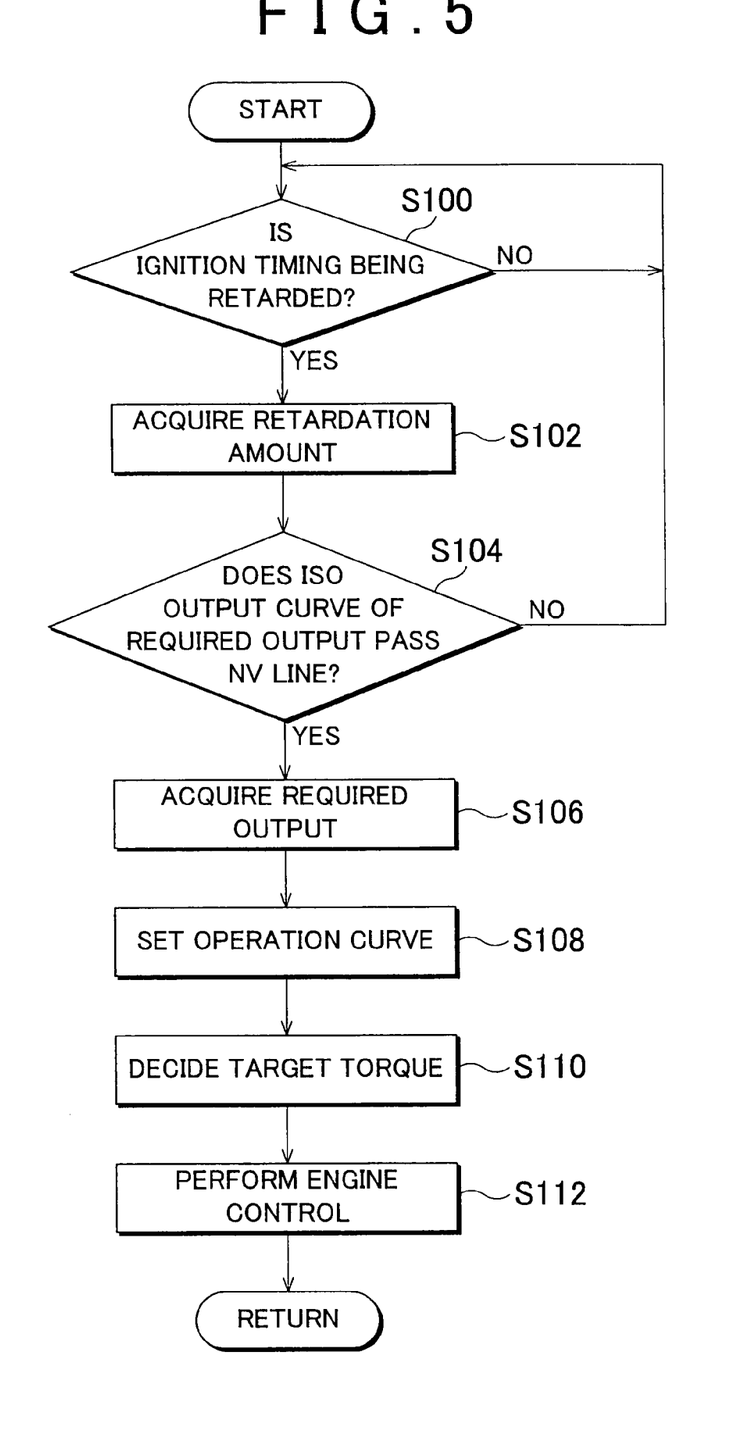
FIG. 5 is a chart showing a control structure of a program executed by the engine ECU as the control apparatus for the vehicle according to the first embodiment of the invention.

In a flowchart shown in FIG. 7, processings identical to those of the aforementioned flowchart shown in FIG. 5 are denoted by the same step numbers respectively. Accordingly, detailed description of those processings will not be described herein.

In S200, the engine ECU 280 determines whether or not there is a high load running history. When there is a high load running history (YES in S200), the processing procedure is shifted to S100. If not (NO in S200), the processing procedure is returned to S200.

The operation of the engine ECU 280 as the control apparatus for the vehicle according to this embodiment of the invention, which is based on the aforementioned flowchart, will be described.

For example, a required driving force is calculated on the basis of an opening degree of the accelerator pedal based on the operation of the driver. A required output is calculated on the basis of the calculated required driving force and a speed of the vehicle. An iso output curve is specified on the basis of the calculated required output.

For example, when it is determined that there is no high load running history (NO in S200), the NV line is set as the operation curve of the engine 120. Therefore, a torque corresponding to an intersection point of the NV line and the specified iso output curve is decided as a target torque. The engine 120 is controlled on the basis of the decided target torque. The engine 120 operates along the NV line unless a high load running history is detected.

On the other hand, when the temperature of coolant continues to be equal to or higher than a predetermined temperature until the lapse of a predetermined time due to the continuation of uphill running or the like of the vehicle, it is determined that there is a high load running history (YES in S200), and it is determined whether or not the ignition timing of the engine 120 is being retarded (S100).

When the ignition timing of the engine 120 is retarded with respect to a predetermined retardation amount (YES in S100), a retardation amount is acquired (S102). When it is determined that an iso output curve of a required output based on a required driving force passes the NV line (YES in S104) and the required output of the engine 120 is acquired (S106), an operation curve is set on the basis of the acquired retardation amount (S108). A torque Te corresponding to an intersection point of the iso output curve of the acquired required output and the set operation curve is then decided as a target torque (S110). The engine 120 is controlled on the basis of the decided target torque (S112). The engine 120 operates along the set operation curve unless the retardation amount further increases.

It should be noted herein that since the set operation curve has a sharper increase in torque for an increase in engine rotational speed and is closer to the optimal fuel consumption operation curve than the NV line, an improvement in fuel consumption is made in comparison with a case where the engine 120 is operated along the NV line.

Further, the level of engine noise increases as a result of the approach of the operation curve to the optimal fuel consumption operation curve with a view to operating the engine 120 along the operation curve that is closer to the optimal fuel consumption operation curve than the NV line. However, the ignition timing is set on the retardation side to reduce engine noise, and an increase in the level of noise is thereby absorbed.

As described above, according to the control apparatus for the vehicle according to this embodiment of the invention, in addition to the effect exerted by the control apparatus for the vehicle according to the first embodiment of the invention, the following effect may be achieved. In general, when the load history of the engine (e.g., the history of the temperature of coolant) is a history of intermittently or continuously remaining in a high load state, the temperature in the engine room has risen, and a deterioration in overheat tolerance may therefore be caused. Thus, according to this embodiment of the invention, the operation curve of the internal combustion engine is set in accordance with the ignition timing to make an improvement in fuel consumption. A rise in thermal efficiency thereby occurs, and the temperature of exhaust gas is restrained from rising. As a result, a deterioration in overheat tolerance can be suppressed.

A control apparatus for a vehicle according to the third embodiment of the invention will be described hereinafter. The control apparatus for the vehicle according to this embodiment of the invention is different in the control structure of a program executed by the engine ECU 280 from the control apparatus for the vehicle according to the foregoing first embodiment of the invention. The other components of the control apparatus for the vehicle according to the third embodiment of the invention are identical to those of the control apparatus for the vehicle according to the foregoing first embodiment of the invention and the control apparatus for the vehicle according to the foregoing second embodiment of the invention. Those components are denoted by the same reference symbols and function in the same manner as well. Accordingly, detailed description of those components will not be described herein.

This embodiment of the invention is characterized in that the engine ECU 280 sets the operation curve of the engine 120 such that the operation curve approaches the optimal fuel consumption operation curve as the gradient of a road surface as well as the retardation amount increases.

A control structure of a program executed by the engine ECU 280 as the control apparatus for the vehicle according to this embodiment of the invention will be described hereinafter with reference to FIG. 8.

Figure 8:
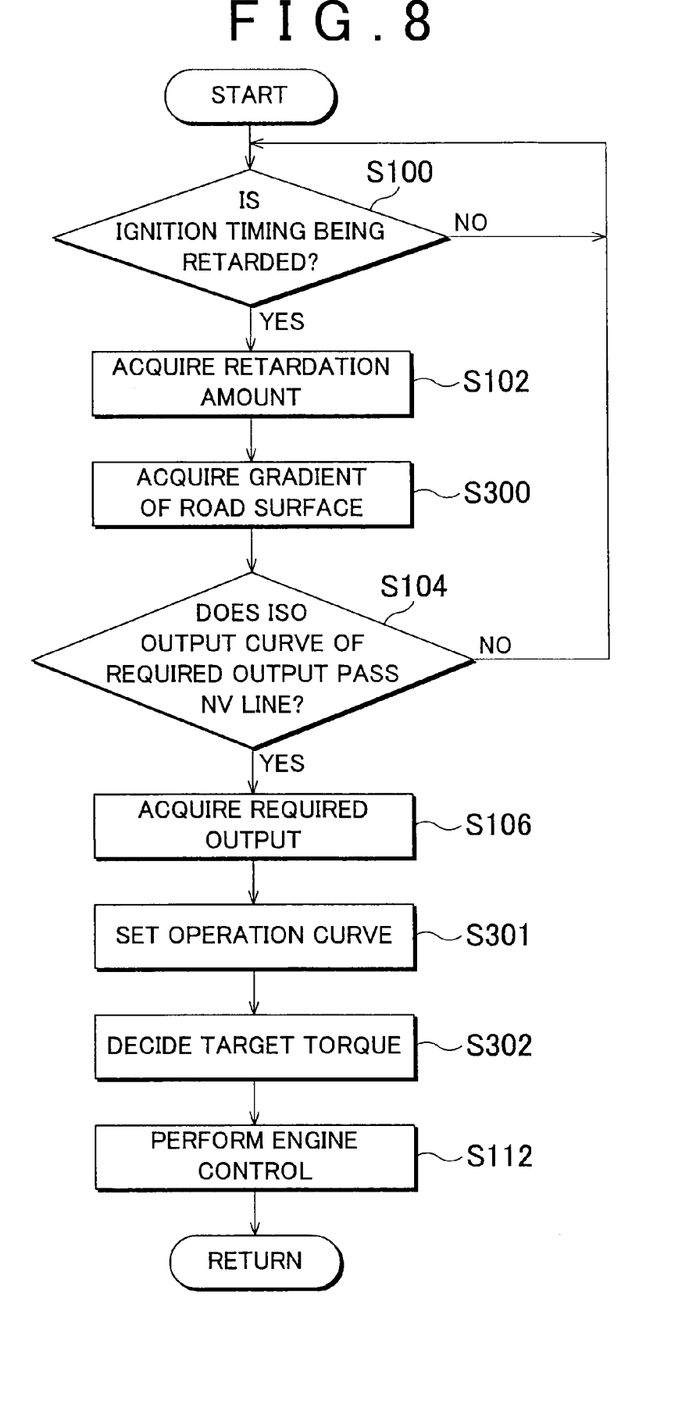
FIG. 8 is a chart showing a control structure of a program executed by an engine ECU as a control apparatus for a vehicle according to the third embodiment of the invention.

In a flowchart shown in FIG. 8, processings identical to those of the aforementioned flowchart shown in FIG. 5 are denoted by the same step numbers respectively. Accordingly, detailed description of those processings will not be described herein.

In S300, the engine ECU 280 acquires a gradient of a road surface by the gradient sensor 390. In S301, the engine ECU 280 sets the operation curve on the basis of the acquired retardation amount and the gradient of the road surface. In S302, the engine ECU 280 decides a target torque on the basis of a required output of the engine 120 and the set operation curve.

For example, the engine ECU 280 may specify one of a plurality of operation curves that are stored in advance into the storage portion 530 from retardation amounts and gradients of a road surface respectively. The operation curves may be given by a table obtained by adding the term of gradient of road surface to the table shown in FIG. 4, a mathematical expression, or a map. Instead, the engine ECU 280 may decide as a target torque a value obtained by multiplying a torque specified according to the table shown in FIG. 4 by a correction coefficient corresponding to a gradient of a road surface.

The engine ECU 280 sets the operation curve such that the operation curve approaches the optimal fuel consumption operation curve as the retardation amount increases and the gradient of the road surface increases.

The operation of the engine ECU 280 as the control apparatus for the vehicle according to this embodiment of the invention, which is based on the aforementioned flowchart, will be described.

For example, a required driving force is calculated on the basis of an opening degree of the accelerator pedal based on the operation of the driver. A required output is calculated on the basis of the calculated required driving force and a speed of the vehicle. An iso output curve is specified on the basis of the calculated required output. When the ignition timing of the engine 120 is not being retarded (NO in S100), the NV line is set as the operation curve of the engine 120. Therefore, a torque corresponding to an intersection point of the NV line and the iso output curve is decided as a target torque. The engine 120 is controlled on the basis of the decided target torque. The engine 120 operates along the NV line unless the retardation amount increases.

On the other hand, when the ignition timing of the engine 120 is being retarded due to a decrease in the speed of the vehicle and a rise in load or the like resulting from uphill running of the vehicle on a road surface with a large gradient (YES in S100), a retardation amount is acquired (S102), and the gradient of the road surface is acquired (S300). When it is determined that an iso output curve of a required output based on a required driving force passes the NV line (YES in S104) and the required output of the engine 120 is acquired (S106), an operation curve is set on the basis of the acquired retardation amount and the acquired gradient of the road surface (S301). A torque corresponding to an intersection point of an iso output curve of the acquired required output and the set operation curve is then decided as a target torque (S302). The engine 120 is controlled on the basis of the decided target torque (S112). The engine 120 operates along the set operation curve unless the retardation amount further increases.

It should be noted herein that since the set operation curve has a sharper increase in torque for an increase in engine rotational speed and is closer to the optimal fuel consumption operation curve than the NV line, an improvement in fuel consumption is made in comparison with a case where the engine 120 is operated along the NV line. Further, in the case where the gradient of the road surface is large, the engine 120 is operated along an operation curve still closer to the optimal fuel consumption operation curve, and hence a further improvement in fuel consumption is made.

Further, the level of engine noise increases as a result of the approach of the operation curve to the optimal fuel consumption operation curve with a view to operating the engine 120 along the operation curve, which is closer to the optimal fuel consumption operation curve than the NV line. However, the ignition timing is set on the retardation side to reduce engine noise, and an increase in the level of noise is thereby absorbed. Further, in the case where the gradient of the road surface is large, the engine 120 is operated along the operation curve still closer to the optimal fuel consumption operation curve, and the level of noise generated in the engine 120 increases correspondingly. However, this increase in the level of noise coincides with the driver's recognition that uphill running of the vehicle is associated with an increase in the level of engine noise resulting from a rise in the output of the engine. Therefore, the driver can be restrained from feeling uncomfortable.

As described above, according to the control apparatus for the vehicle according to this embodiment of the invention, in addition to the effect exerted by the control apparatus for the vehicle according to the first embodiment of the invention, an improvement in fuel consumption can be made by setting the operation curve of the internal combustion engine such that the operation curve approaches the optimal fuel consumption operation curve as the detected gradient of the road surface as well as the retardation amount increases. Further, an increase in the level of engine noise, which is caused by setting the operation curve such that the operation curve approaches the optimal fuel consumption operation curve, coincides with the driver's recognition that uphill running of the vehicle is associated with an increase in the level of engine noise resulting from a rise in the output of the engine. Therefore, the driver can be restrained from feeling uncomfortable.

The embodiments of the invention disclosed this time should be considered to be exemplary in all respects and not limitative. The scope of the invention is not defined by the foregoing description but by the claims. The invention is intended to include all the modifications that are equivalent in significance and scope to the claims.

While the invention has been described with reference to the example embodiments thereof, it should be understood that the invention is not limited to the example embodiments or constructions. To the contrary, the invention is intended to cover various modifications and equivalent arrangements. In addition, while the various elements of the example embodiments are shown in various combinations and configurations, which are exemplary, other combinations and configurations, including more, less or only a single element, are also within the spirit and scope of the invention.

What is claimed is:

1. A control apparatus for a vehicle mounted with an internal combustion engine and a transmission that continuously changes a transmission speed of a motive power of the internal combustion engine and transmits the motive power to driving wheels, wherein
one of a plurality of operation curves that are set on a basis of a state of the internal combustion engine on a coordinate plane corresponding to torque and rotational speed and that define torque and rotational speed for achieving a required output of the internal combustion engine is selected as a first operation curve, the internal combustion engine is operationally controlled along the selected first operation curve,
a second operation curve corresponding to the internal combustion engine is set in advance on the coordinate plane, and the second operation curve is an operation curve that is set such that fuel consumption is lower when the internal combustion engine is operated along the second operation curve than when the internal combustion engine is operated along any of the plurality of the operation curves,
comprising:
a detection portion that detects a required output of the internal combustion engine;
an acquisition portion that acquires an ignition timing of the internal combustion engine;
a selection portion that selects one of the plurality of the operation curves as the first operation curve such that the first operation curve approaches the second operation curve as the acquired ignition timing is retarded with respect to a set ignition timing;
a decision portion that decides a target power of the internal combustion engine on a basis of the detected required output and the first operation curve; and
a control portion that controls the internal combustion engine on a basis of the decided target power.

2. The control apparatus for the vehicle according to claim 1, wherein:
the selection portion includes
a part that selects one of the plurality of the operation curves as the first operation curve such that the first operation curve approaches the second operation curve as the ignition timing is retarded with respect to the set ignition timing when the detected required output is equal to or larger than a first predetermined output and equal to or smaller than a second predetermined output that is larger than the first predetermined output, and
a part that selects the second operation curve as the first operation curve when the detected required output is larger than the second predetermined output; and
an operation region of the internal combustion engine, which is equal to or larger than the first predetermined output and equal to or smaller than the second predetermined output, is an operation region in which levels of vibration and noise generated are higher when the internal combustion engine is operated along the second operation curve than when the internal combustion engine is operated along the first operation curve.

3. The control apparatus for the vehicle according to claim 2, wherein a third operation curve among the plurality of the operation curves, which is selected when the ignition timing is retarded with respect to the ignition timing set in advance, is an operation curve having a lower rotational speed and a larger torque for the same output than a fourth operation curve among the plurality of the operation curves, which is selected when the ignition timing is the ignition timing set in advance.

4. The control apparatus for the vehicle according to claim 1, wherein:
the control apparatus further comprises a portion that detects a load history of the internal combustion engine; and
the selection portion selects the first operation curve in accordance with the acquired ignition timing when the detected load history is a history that indicates intermittent or continuous operation in a high load state.

5. The control apparatus for the vehicle according to claim 1, wherein:
the control apparatus further comprises a portion that detects a gradient of a road surface; and
the selection portion selects the first the operation curve in accordance with the detected gradient of the road surface in addition to the acquired ignition timing such that the first operation curve approaches the second operation curve as the detected gradient of the road surface increases.

6. The control apparatus for the vehicle according to claim 1, wherein the transmission is a continuously variable transmission.

7. The control apparatus for the vehicle according to claim 1, wherein:
the vehicle includes
a first rotating electrical machine that serves as a drive source of the vehicle, and a second rotating electrical machine that generates an electric power on a basis of a motive power of the internal combustion engine;
the transmission is a motive power splitting mechanism that transmits a motive power of at least one of the internal combustion engine and the first rotating electrical machine to an axle of the vehicle; and the motive power splitting mechanism outputs an input motive power of the internal combustion engine or an input motive power of the first rotating electrical machine after splitting the input motive power into a driving force for the axle or a motive power for the second rotating electrical machine.

8. A control method for a vehicle mounted with an internal combustion engine and a transmission that continuously changes a transmission speed of a motive power of the internal combustion engine and transmits the motive power to driving wheels, wherein one of a plurality of operation curves that are set on a basis of a state of the internal combustion engine on a coordinate plane corresponding to torque and rotational speed and that define torque and rotational speed for achieving a required output of the internal combustion engine is selected as a first operation curve, the internal combustion engine is operationally controlled along the selected first operation curve, a second operation curve corresponding to the internal combustion engine is set in advance on the coordinate plane, and the second operation curve is an operation curve that is set such that fuel consumption is lower when the internal combustion engine is operated along the second operation curve than when the internal combustion engine is operated along any of the plurality of the operation curves, comprising:

a detection step of detecting a required output of the internal combustion engine;

an acquisition step of acquiring an ignition timing of the internal combustion engine;

a selection step of selecting one of the plurality of the operation curves as the first operation curve such that the first operation curve approaches the second operation curve as the acquired ignition timing is retarded with respect to a set ignition timing;

a decision step of deciding a target power of the internal combustion engine on a basis of the detected required output and the first operation curve; and a control step of controlling the internal combustion engine on a basis of the decided target power.

9. The control method for the vehicle according to claim 8, wherein:

the selection step includes a step of selecting one of the plurality of the operation curves as the first operation curve such that the first operation curve approaches the second operation curve as the ignition timing is retarded with respect to the set ignition timing when the detected required output is equal to or larger than a first predetermined output and equal to or smaller than a second predetermined output that is larger than the first predetermined output, and a step of selecting the second operation curve as the first operation curve when the detected required output is larger than the second predetermined output; and an operation region of the internal combustion engine, which is equal to or larger than the first predetermined output and equal to or smaller than the second predetermined output, is an operation region in which levels of vibration and noise generated are higher when the internal combustion engine is operated along the second operation curve than when the internal combustion engine is operated along the first operation curve.

10. The control method for the vehicle according to claim 9, wherein a third operation curve among the plurality of the operation curves, which is selected when the ignition timing is retarded with respect to the ignition timing set in advance, is an operation curve having a lower rotational speed and a larger torque for the same output than a fourth operation curve among the plurality of the operation curves, which is selected when ignition timing is the ignition timing set in advance.

11. The control method for the vehicle according to claim 8, wherein:

the control method further comprises detecting a load history of the internal combustion engine; and in the selection step, the first operation curve is selected in accordance with the acquired ignition timing when the detected load history is a history that indicates intermittent or continuous operation in a high load state.

12. The control method for the vehicle according to claim 8, wherein:

the control method further comprises a step of detecting a gradient of a road surface; and in the selection step, the first operation curve is selected in accordance with the detected gradient of the road surface in addition to the acquired ignition timing such that the first operation curve approaches the second operation curve as the detected gradient of the road surface increases.

13. The control method for the vehicle according to claim 8, wherein the transmission is a continuously variable transmission.

14. The control method for the vehicle according to claim 8, wherein:

the vehicle includes a first rotating electrical machine that serves as a drive source of the vehicle, and a second rotating electrical machine that generates an electric power on a basis of a motive power of the internal combustion engine;

the transmission is a motive power splitting mechanism that transmits a motive power of at least one of the internal combustion engine and the first rotating electrical machine to an axle of the vehicle and the motive power splitting mechanism outputs an input motive power of the internal combustion engine or an input motive power of the first rotating electrical machine after splitting the input motive power into a driving force for the axle or a motive power for the second rotating electrical machine.

* * * * *